(12) United States Patent
Di Bernardo (10) Patent No.: US 6,613,178 B1
(45) Date of Patent: Sep. 2, 2003

(54) PROCEDURE FOR THE COVERING OF EDITORIAL ITEMS

(75) Inventor: Pietro Di Bernardo, Milan (IT)

(73) Assignee: Interdibipack S.p.A., Milan (IT)

( * ) Notice: Subject to any disclaimer, the term of this patent is extended or adjusted under 35 U.S.C. 154(b) by 259 days.

(21) Appl. No.: 09/614,103

(22) Filed: Jul. 12, 2000

(30) Foreign Application Priority Data

Jul. 15, 1999 (IT) .......................................... MI99A1561
May 31, 2000 (IT) ................................. MI2000A001203

(51) Int. Cl.[7] .............................................. B32B 31/18
(52) U.S. Cl. ..................... 156/267; 156/73.5; 156/515; 412/4; 281/29
(58) Field of Search ................................ 156/73.3, 73.5, 156/202, 204, 206, 226, 251, 267, 270, 515, 227; 412/4–5, 19, 21; 281/29; 493/227, 243

(56) References Cited

U.S. PATENT DOCUMENTS

| | | | | |
|---|---|---|---|---|
| 2,460,460 A | * | 2/1949 | Langer | 156/308.4 |
| 2,961,031 A | * | 11/1960 | Fener | 156/515 |
| 3,713,941 A | * | 1/1973 | Saurs | 156/251 |
| 5,177,931 A | * | 1/1993 | Latter | 493/929 |
| 5,806,280 A | * | 9/1998 | Su | 156/251 |
| 5,851,031 A | * | 12/1998 | Golson | 281/19.1 |

* cited by examiner

Primary Examiner—Michael W. Ball
Assistant Examiner—Jessica Rossi
(74) Attorney, Agent, or Firm—Hedman & Costigan, P.C.

(57) ABSTRACT

A procedure for the covering of editorial items foresees at least the following steps: the positioning of an editorial object (10) to be covered, on a thermoplastic film (11), fitted with folds (12, 13, 31, 32) on its sides, so that the editorial object (10), open on the folded film indicated, has the sides (14, 15) of its cover tucked within the folds (12, 13, 31, 32); to bring the editorial object (10) in contact with the head weld (30) of the film so that it is in a suitable position for the cutting of the excess film and for the welds required to trim the sides of the editorial object (10), where the cutting and trimming operations are carried out through the use of a lever (17, 22, 24), fitted with hot resistances (18, 23, 25). The invention comprise also a device (110) for the covering of editorial objects.

7 Claims, 16 Drawing Sheets

PROCEDURE FOR THE COVERING OF EDITORIAL ITEMS

BACKGROUND OF THE INVENTION

The present invention relates to a procedure for the covering of editorial items such as, for example, books, folders, post cards, greetings cards, magazines, calendars, small posters, photographs, photo-engravings etc.

Furthermore, the present invention relates to a device to cover editorial items.

There are well known procedures and methods used to cover books, or other editorial items, using covers of the largest dimensions of the editorial items in question and which are cut down to size around each one.

These kinds of systems, however, create an excessive waste of material.

Another method of covering involves the use of covers, complete with an adhesive strip or a double sided adhesive strip, which block such covers on the book cover or on the editorial object.

The disadvantage of these covers is that they are easily removable.

Some covers also exist which are just folded or closed, with additional elements: a bookmark or a protection for the corners of the pages.

SUMMARY OF THE INVENTION

Another objective of the present invention is that of carrying out a procedure for the covering of editorial items which allows for such items to be covered with a made-to-measure cover, in just a few seconds and at a very low cost.

Another objective of the invention is that of carrying out a procedure for the covering of editorial items which can be done on well known standard corner welding machines.

These and other objectives are achieved by a procedure for the covering of editorial items, comprising the positioning of an editorial object (10) to be covered on a thermoplastic film (11) fitted with folds (12, 13, 31, 32) on its sides, so that said editorial object (10), open on the folded film, has the sides (14, 15) of its cover tucked within said folds (12,13, 31, 32), bringing said editorial object (10) in contact with a head weld (30) of the film so that it is in a suitable position for the cutting and trimming of excess film and for welding of said sides of said editorial object (10), wherein said cutting and trimming operations are carried out through the use of a lever (17, 22, 24) fitted with hot resistances (18, 23, 25).

Furthermore, the objective of this invention is that of providing a device for the covering of editorial items which allows for the covering of editorial items with an ideal preciseness, in particular minimizing waste and allowing for the covering of the widest range of articles.

Further features of the invention are defined in the other claims attached to the present patent application.

BRIEF DESCRIPTION OF THE DRAWINGS

Further objectives and advantages of the present invention will be clear from the following description and drawings attached, provided purely as an explicative and not a limitative example, in which.

DETAILED DESCRIPTION OF THE INVENTION

With particular reference to FIGS. 1–10, the procedure of the present invention includes the covering of a book, or another editorial object, indicated in its whole with the reference numeral 10, carried out using a reel 21 of thermoplastic film 11, already bent with mechanical systems and in the dimensions required.

In particular, the sheet of thermoplastic film 11 has a fixed fold 12 which is narrower than the fold 13, which will subsequently be cut down.

Figure 1:
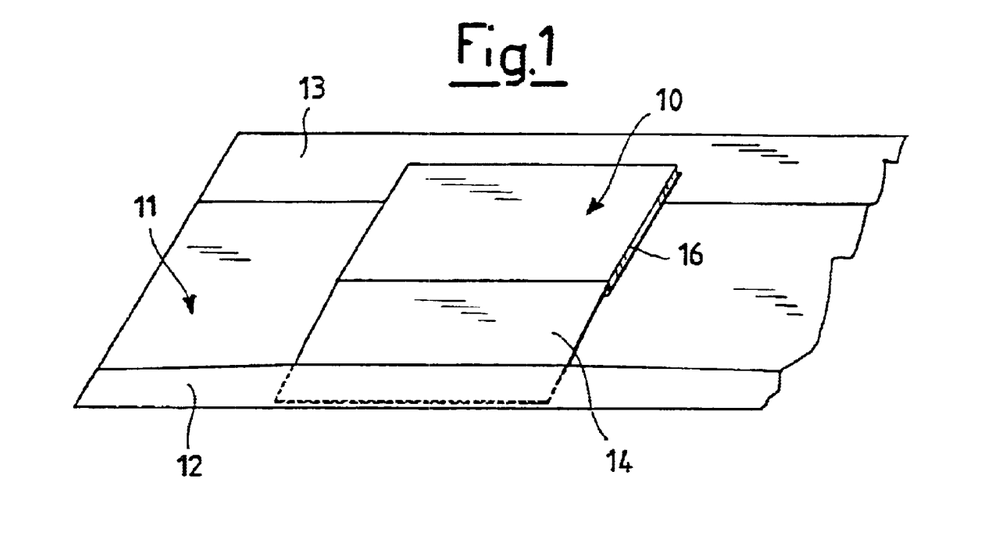
FIG. 1 is a schematic view of the first procedure step of covering of editorial items, according to the present invention.

As can be seen from FIG. 1, the book 10 to be covered, with numerous pages 16, is placed open on the folded film 11, in such a way that it has one side 14 of the cover tucked inside the smaller fold 12, which is fixed for all of the reels 21.

Subsequently, the book 10, which is always open, is placed on the thermoplastic film 11, in such a way that both sides 14 and 15 of the cover are tucked into the folds of the film 11, and in particular, in such a way that fold 15 of the cover is tucked inside the larger fold 13 of the thermoplastic film 11.

Figure 2:
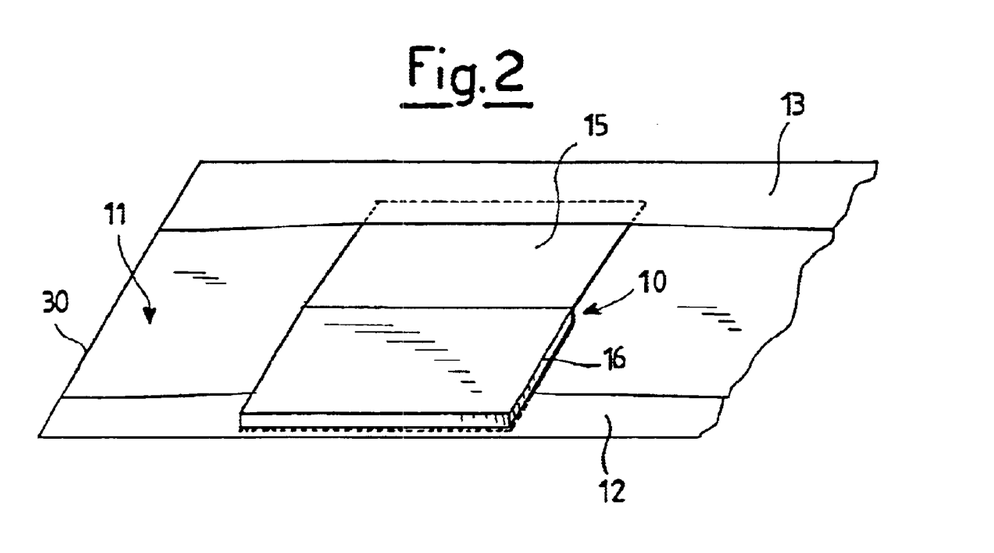
FIGS. 2–7 are schematic views of the subsequent steps of the procedure of covering of editorial items, according to the present invention.

Furthermore book 10 is open and positioned with its pages 16 at the narrower fold 12; the result of these procedures can be seen in FIG. 2.

For greater convenience, such insertion of book 10 is carried out away from the top weld 30 of the film 11.

Figure 3:
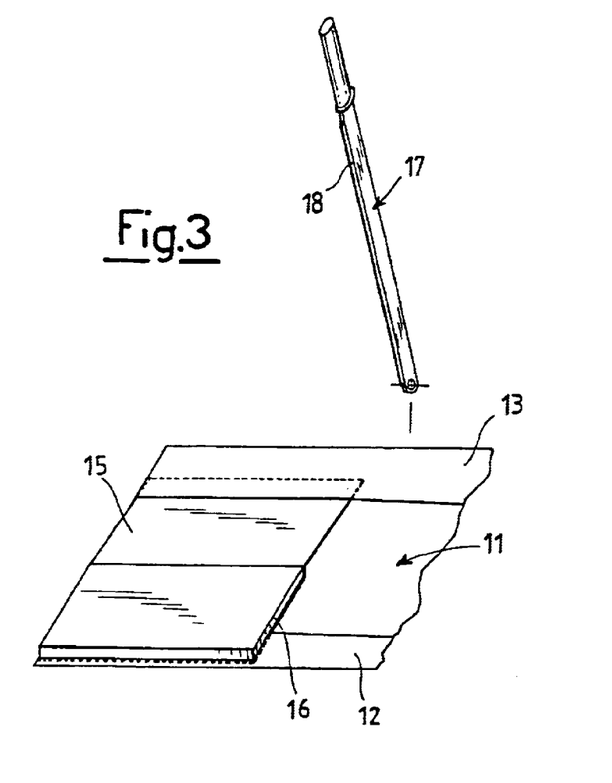
Figure 4:
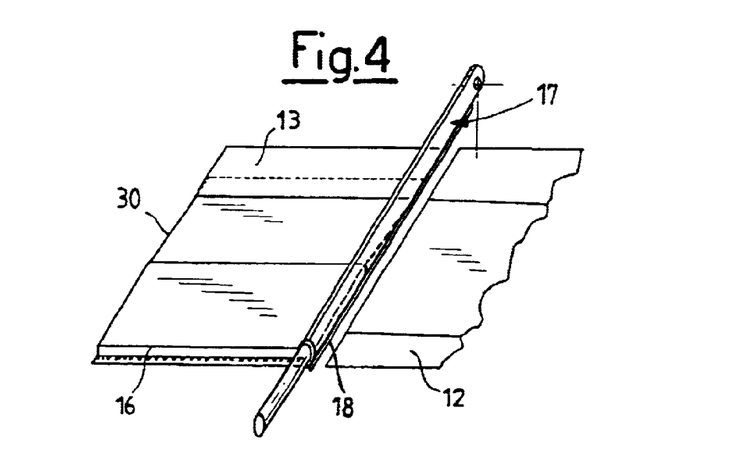

The book 10 is then placed next to the top weld 30 of the film 11, as indicated in FIG. 3, and subsequently pushed into an ideal position for a longitudinal cut and welding which is carried out using a lever 17, with a hot resistance 18.

Figure 14:
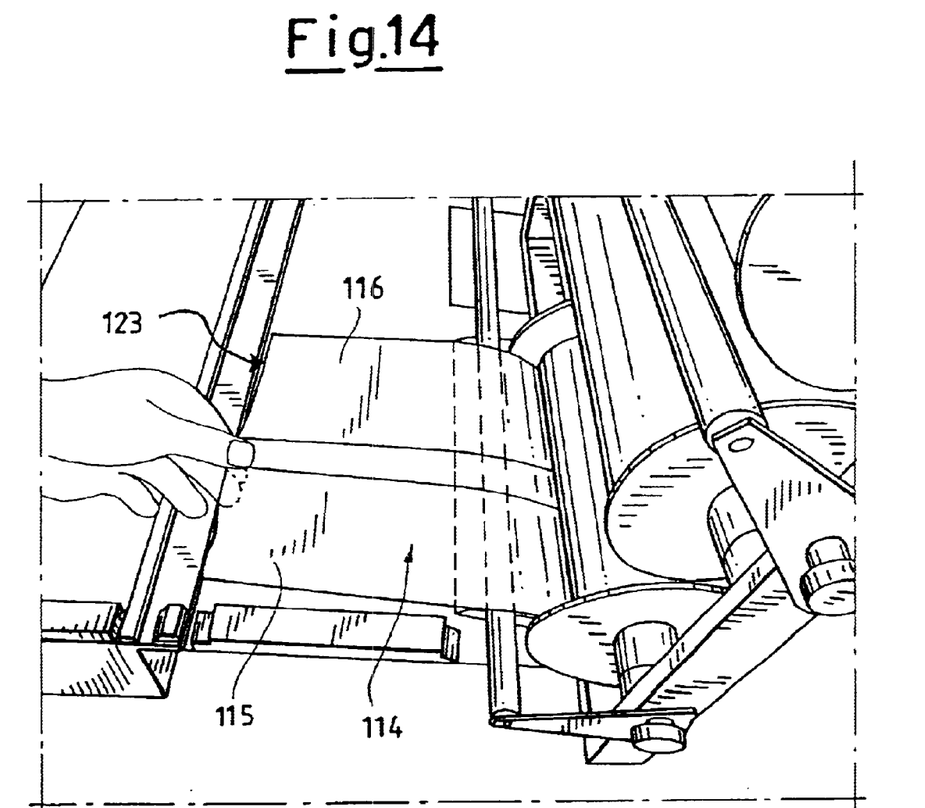

As can be seen in FIG. 14, the film 11 is cut, using the lever 17, and at the same time the welding is carried out, through the use of a hot resistance 18, of the folds of the film itself in order to block the long side of the book 10 perfectly, opposite the top weld 30 of the film 11.

Figure 5:
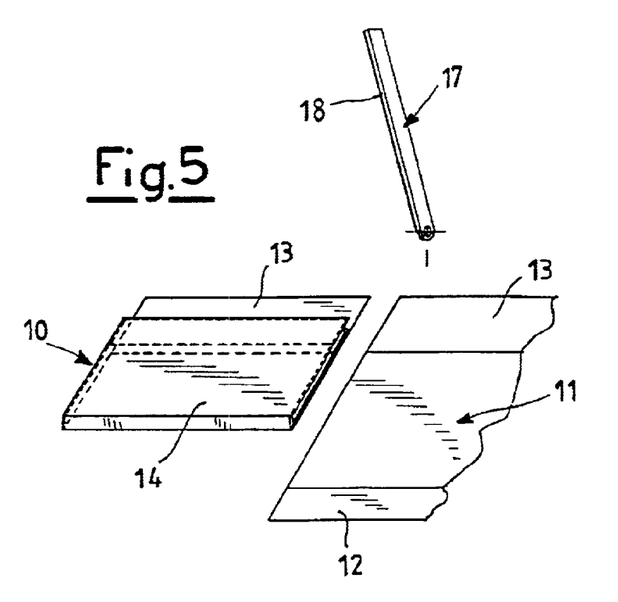
Figure 6:
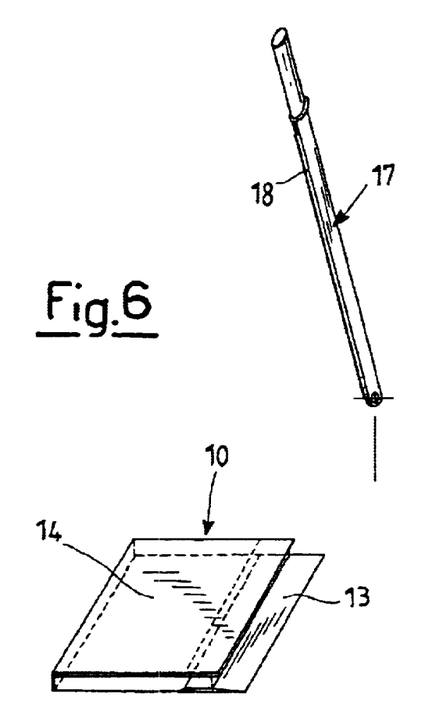
Figure 7:
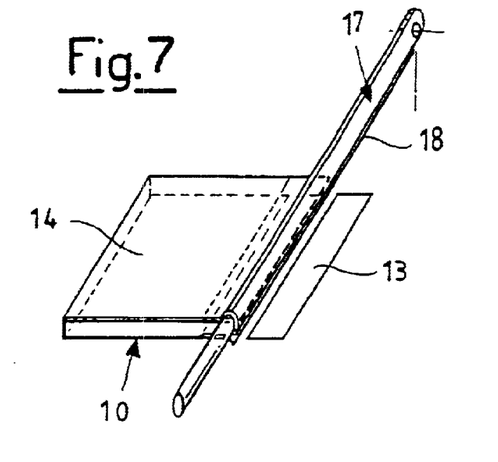

Subsequently the book 10 is closed on the wide fold 13 of the film 11 and is turned in order to be positioned to carry out a trimming operation, always carried out using lever 17 which cuts the film 11 in correspondence of the excessive portion 13 of the film 11 and which at the same time, welds the folds, using the hot resistance 18; these operations can be seen in FIGS. 5–7.

In this way, a book 10 which is perfectly contained within its protection is carried out using the covering procedure described, which is difficult to remove, unless the cover is intentionally damaged.

Figure 8:
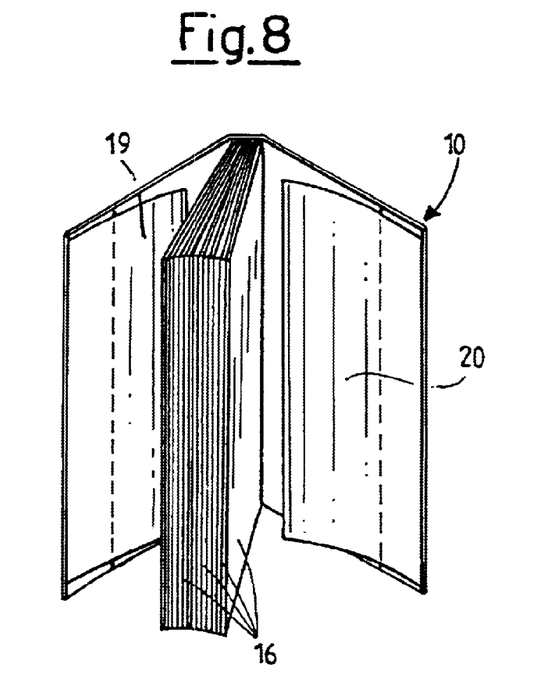
FIG. 8 is a schematic view of a book with an additional cover, according to a variant of the procedure of the invention.

A variant of the procedure described is that further flaps 19 and 20 of thermoplastic film 11 are added to the book 10 on at least one of the two internal sides of the cover 14 and 15, using at least one additional weld.

The procedure of the invention can even be applied using well known standard corner welding machines, carrying out two welds and trimmings with just one operation, for identical books and/or of identical dimensions.

Figure 9:
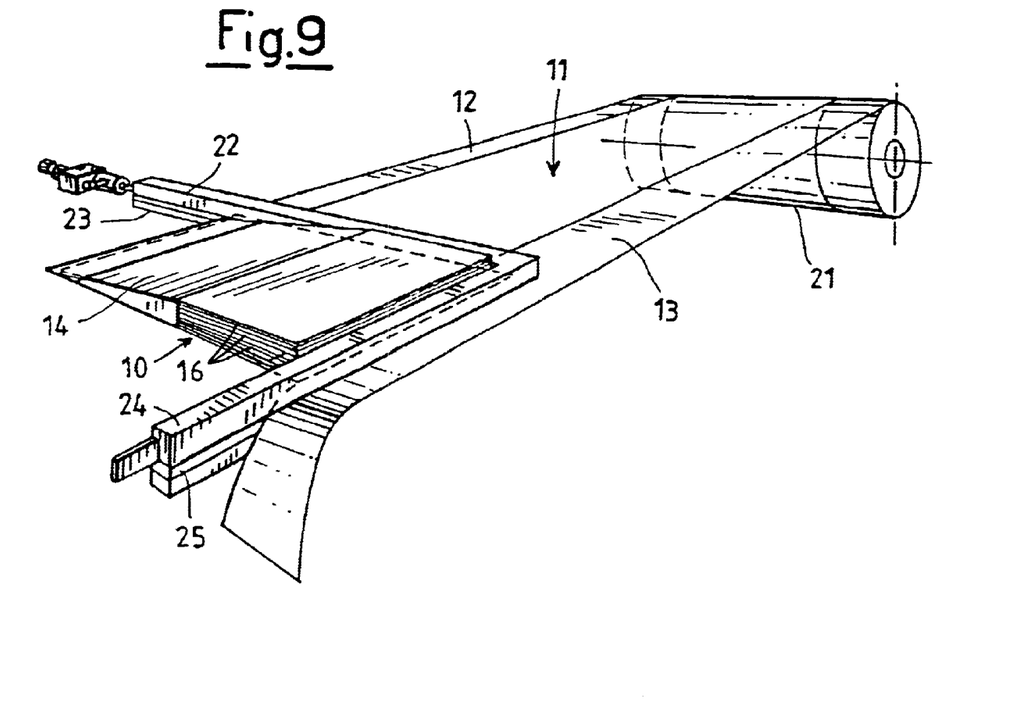
FIG. 9 is a schematic view of the procedure of the invention, in the event that, a well known corner welding machine is used.

In this case, schematically represented in FIG. 9, a sheet of thermoplastic film 11, already folded and complete with folds 12 and 13, is supplied by a reel 21.

A book 10 is placed onto the sheet of thermoplastic film 11 with the extremities 14 and 15 inserted, as previously described, within the folds 12 and 13 of the film 11.

The lever 22, fitted with a hot resistance 23, and the lever 24, fitted with a hot resistance 25, carry out, respectively, the operations of cutting and trimming of the long side of the book 10 and trimming of the side of the book 10 inserted within the wider fold 13, as well as the cutting of the wider fold 13 itself.

We must point out that, using a suitable film, in particular a heat-shrinking film, the procedure described can be carried out on welding machines in order to create greater adhesion of the cover of the book 10.

Figure 10:
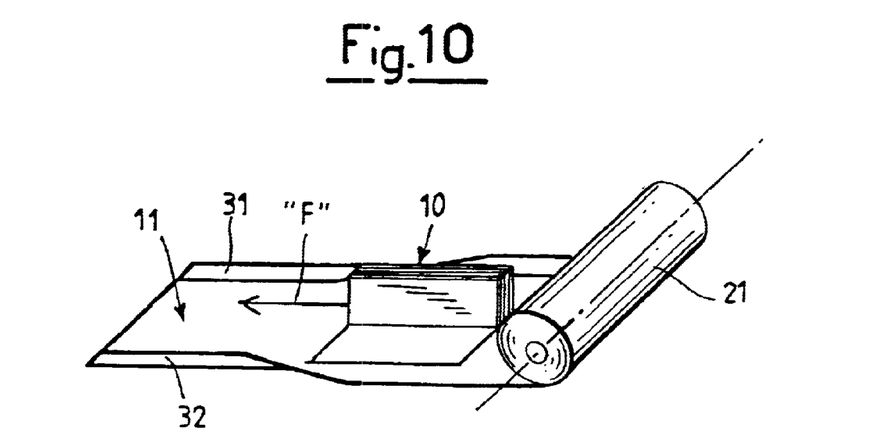
FIG. 10 is a schematic view of a further variant of the procedure of the invention, applied automatically.

The procedure of the invention can also be automated, tucking the open book, in the direction indicated by arrow F in FIG. 10, when the folds 31 and 32 of the film 11, flat, are forming and are not yet folded.

In this case it is preferable that the folds 31 and 32 are of the same width.

Furthermore, the present invention relates to a device for the covering of editorial items.

With particular reference to FIGS. 11–27, the device of the invention is globally indicated with the reference numeral 110.

The device of the invention allows for the covering of an editorial object 111, (in FIG. 11 a book 111), which is carried out using a reel of thermoplastic film which is already folded using mechanical systems and in the dimensions required.

The thermoplastic film can be folded once with identical sides or with different sides.

Figure 11:
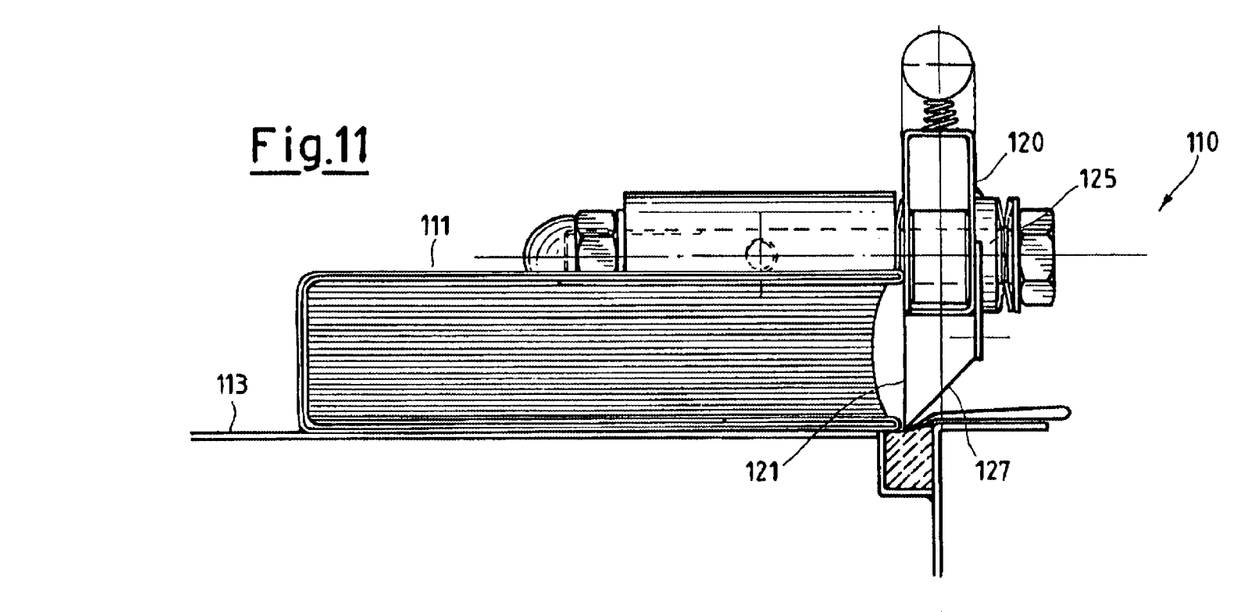
FIG. 11 is a partial section view of the device used for the covering of editorial items, according to this finding, in a first operative position.

In particular, the device 110 presents a work top 113, upon which a sheet cut from a reel of thermoplastic film 114 is placed, fitted with folds 115, 116 on its sides, in order to hold the book 111 to be covered.

In particular, the sheet from the reel of thermoplastic film 114 presents a fixed fold 115 which is narrower than the fold 116, which will subsequently be trimmed.

The device 110 includes, furthermore, numerous rollers 117, 118 and 119 (which can be more than three if necessary) for different dimensions of film to be used in the covering of editorial items of different dimensions.

The device 110 also has a clutched lever 120, which in an off position stops at the point required by the operator, fitted with a hot resistance 121, which is hinged in 125, used to cut and at the same time weld the thermoplastic film 114.

On the side opposite that of the hinge 125 the device 110 includes a straight fixed edge 124, in order to position better the book 111 to be covered.

On the side opposite that where the rollers 117, 118 and 119 are provide, a straight element 126 is to be found, which slides along the fixed straight edge 124.

Figure 12:
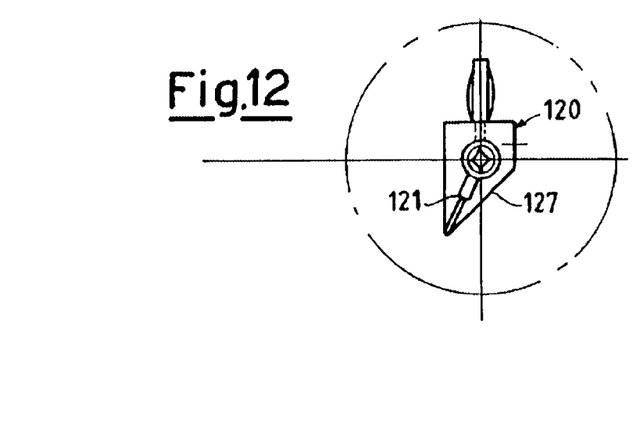
FIG. 12 is a detail, shown in detail, belonging to the device for the covering of editorial items, according to this finding.

The lever 120, fitted with a hot resistance 121, has a blade 127, with a special trapezoidal section shape.

The shape of the blade 127 allows for remarkable work precision and can be placed in line with the book 111 to be covered, as can be seen in FIG. 11.

The functioning of the device 110 for the covering of editorial items is briefly illustrated hereinbelow, with reference to the second type of editorial items, in particular a post card 128, in order to illustrate the versatility of the device 110.

Figure 13:
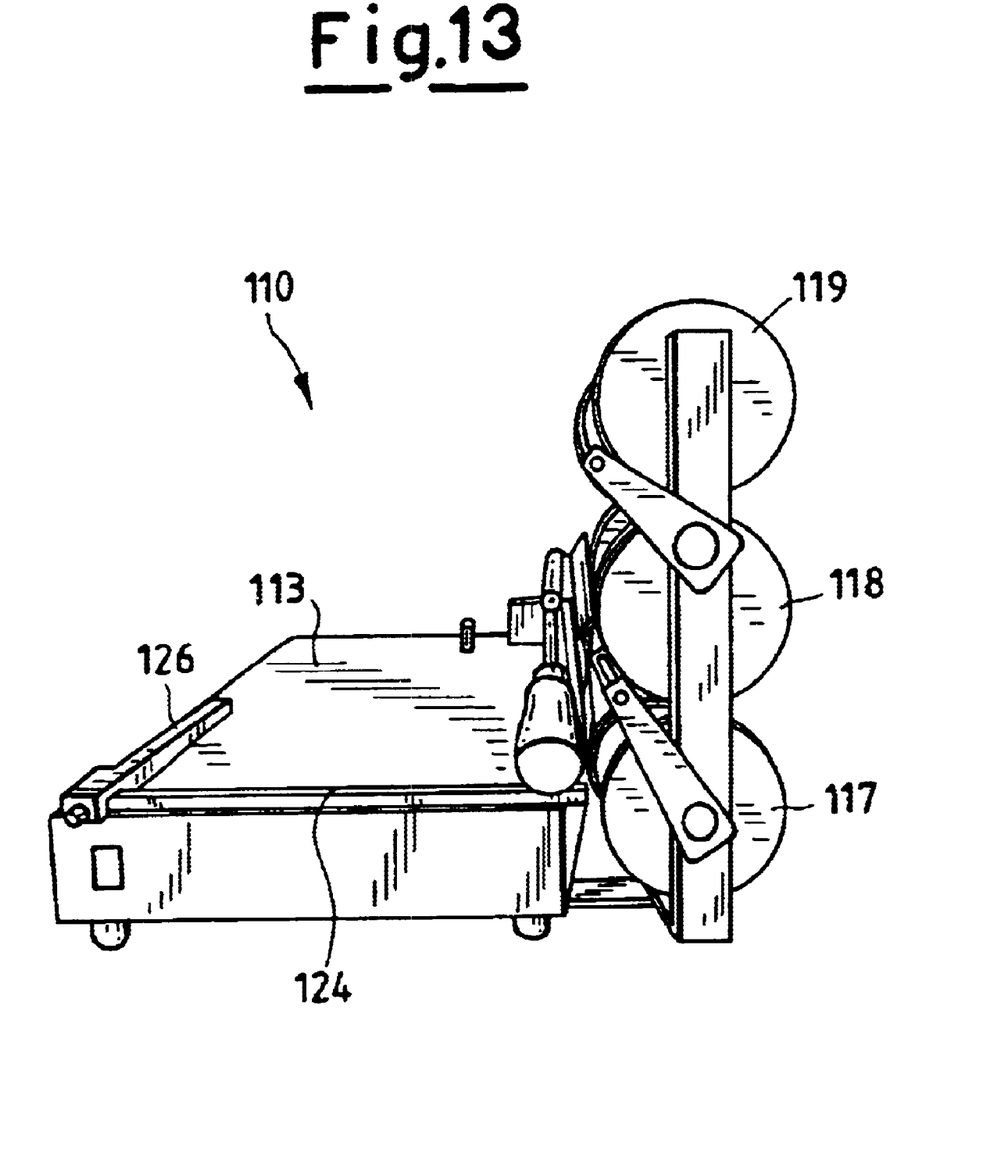
FIGS. 13–16 are perspective views of the device for the covering of editorial items, according to the present finding, during subsequent steps of covering of one of these items.

The post card 128 to be covered is positioned open, on the work top 113, above the folded film 114, in such a way that it has one side tucked within the smaller fold 115 of the thermoplastic film 114, which is fixed for all reels 112 of the same kind.

Subsequently the post card 128, always to be found open, is placed on the thermoplastic film 114, in such a way that both sides of its flat development are tucked within the folds of film 114.

The post card 128 is then laid to rest on the head weld 123 of the film 114, and is subsequently pushed into an ideal position for cutting and a longitudinal weld of the opposite side, which comes about using lever 120, fitted with a hot resistance 121.

The film 114 is then cut, using the lever 120, hinged into 125, and at the same time the welding is carried out, using the hot resistance 121, of the folds of the same film to block perfectly the post card 128 on its long side, opposite the side of the head weld of the film 114.

Subsequently, the post card 128 is closed along the wide fold of the film 114 and is turned in order to be positioned and carry out the trimming operation, always carried out using the lever 120 which cuts the film 114 according to its excessive portion and at the same time, using the hot resistance 121, it welds the folds.

All of these operations can be facilitated and made more precise with the help of a fixed straight edge 124 and the straight sliding element 126, substantially perpendicular.

Figure 16:
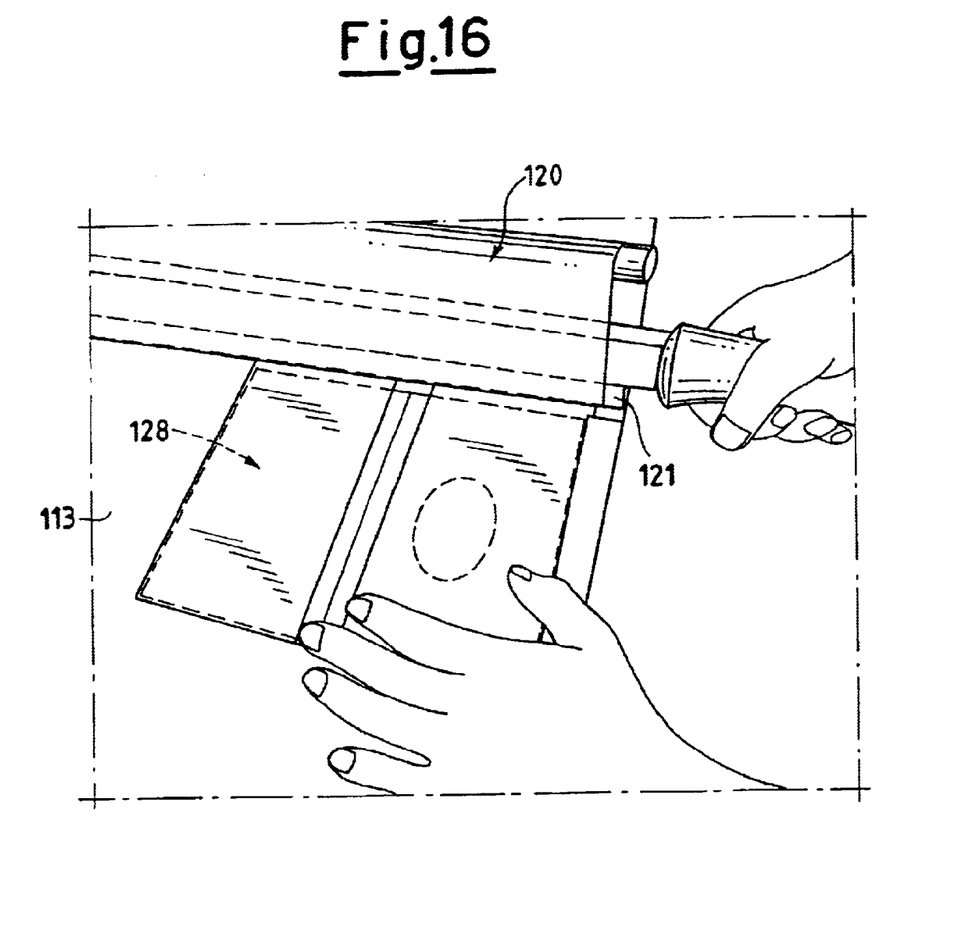

We must point out that, even in this case, the shape of the blade 127, with a trapezoidal section and belonging to the lever 120, fitted with a hot resistance 121, provides remarkable precision, and can be lined up against the post card 128 to be covered, as illustrated in FIG. 16.

In this way, we have a post card 128 which is perfectly contained within its protection made using the method described.

Having to cover editorial items of different sizes a different reel can be used from a different roller 117, 118 and 119, or others and this demonstrates further still the remarkable versatility of the device 110.

Figure 17:
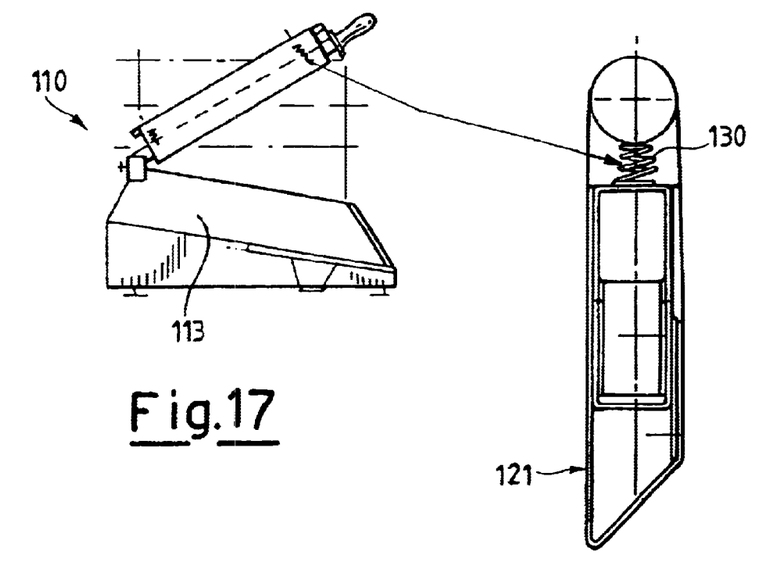
FIG. 17 is the tensioning system, through the use of springs, of the welding protection sleeve in teflon which can be easily repositioned.

Furthermore, we must point out that the device 110 represents a tensioning system through the springs 130 of the welding protection sleeve in teflon which can be easily repositioned.

Figure 18:
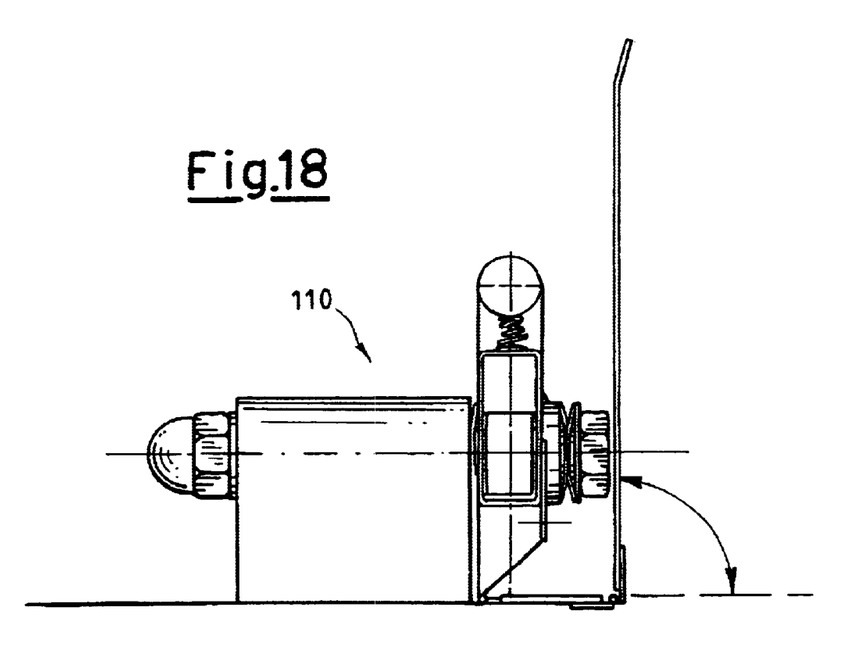
FIG. 18 illustrates the fact that, when not in use, the flap can be raised in order to reduce encumbrance.
Figure 19:
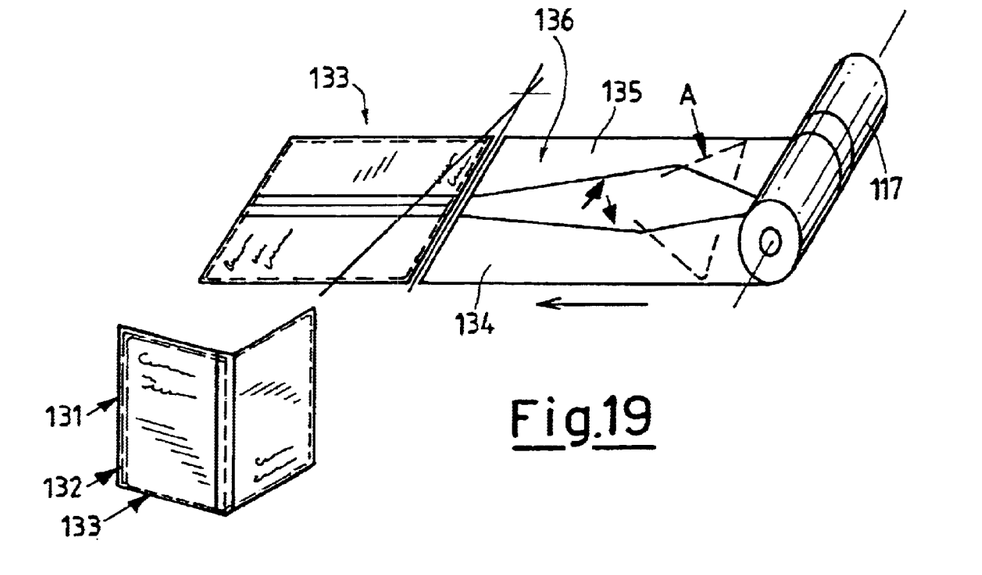
FIG. 19 illustrates an example of covering with identical reels for standard foldable cards, even complete with an envelope, all of which, if necessary, automatically with just one welding.

Furthermore, when not in use the flap can be raised to reduce encumbrance of the device 110. In the case of covering with identical reels 136, with identical sides 134 and 135, for standard foldable cards, welding can also be carried out automatically, in order to create a foldable card 133, complete with an envelope 132 and a cover 131.

Figure 20:
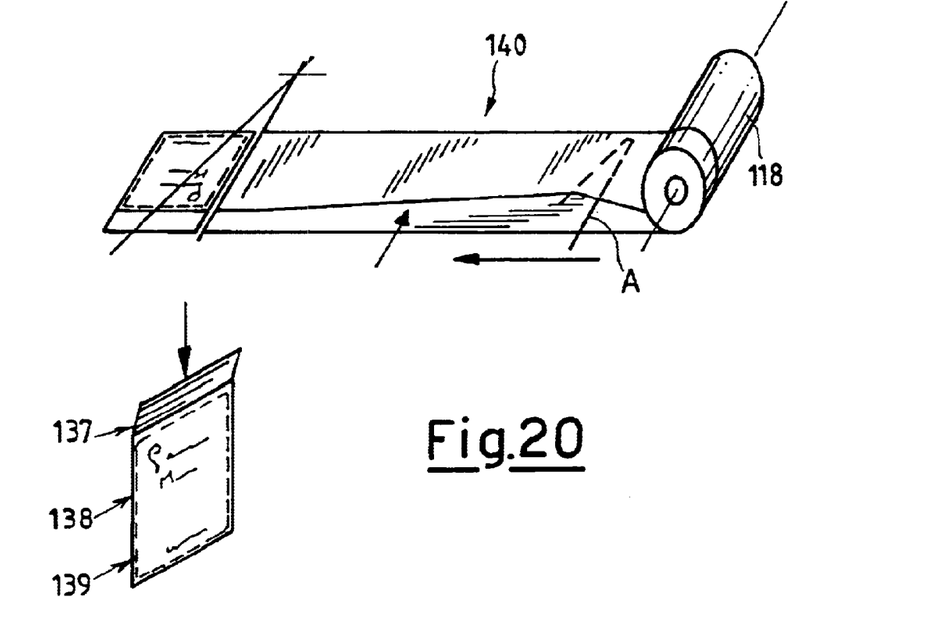
FIG. 20 illustrates an example of covering with a single fold reel with unequal sides for an envelope-type package, all of which, if necessary, automatic with just one welding.

In the case of a cover with a single fold reel 140 with different sides for an envelope-type package, welding can be carried out automatically in order to create a printed object 139, with a cover 138 and a removable wing 137.

Figure 21:
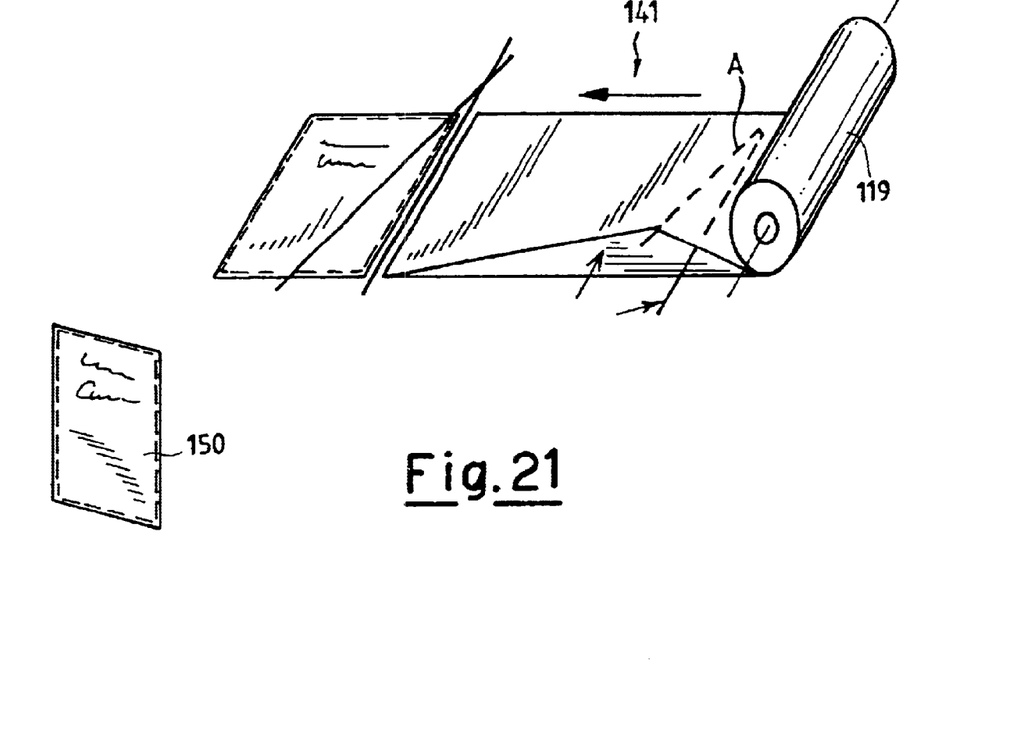
FIG. 21 illustrates a completely closed cover made from a single fold film with equal sides and welded on two sides.

An entirely closed cover 150 can also be made, from a single fold film 141 with identical sides and welded on two sides.

Figure 22:
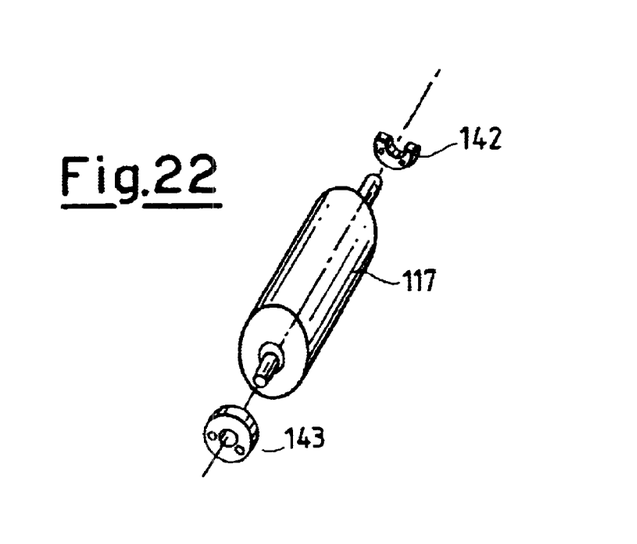
FIG. 22 illustrates the rapid replacement system of the reels with a snap safety block.
Figure 23:
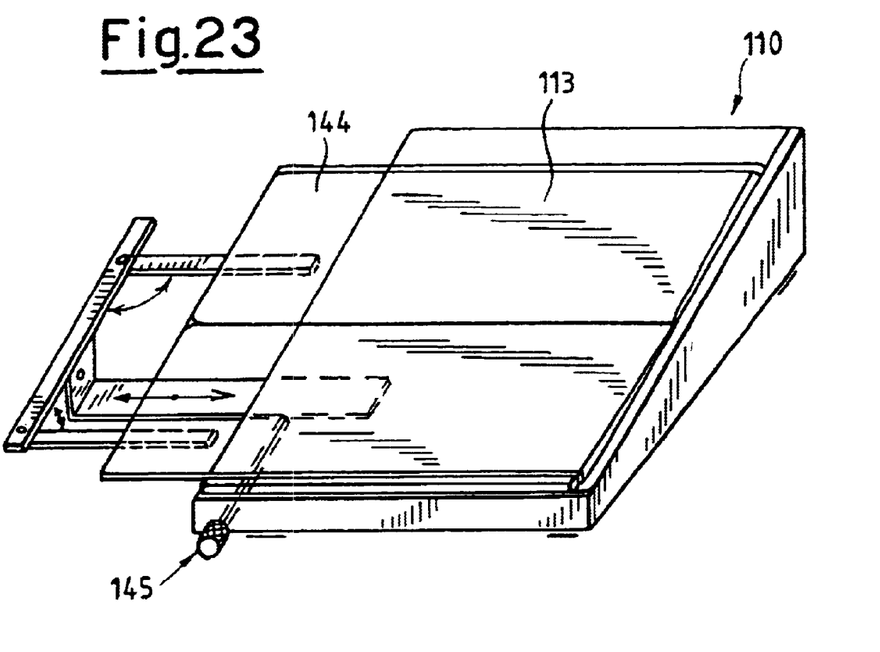
FIG. 23 illustrates an extractable shelf for items that are larger than the work top, which can be fixed through the use of a brake.

A rapid replacement system of the reels with a snap safety block, using elements 142 and 143, is also provided for.

FIG. 13 illustrates an extractable shelf 144 which allows for items that are larger than the work top 113, which can be fixed through the use of a brake 145.

Figure 24:
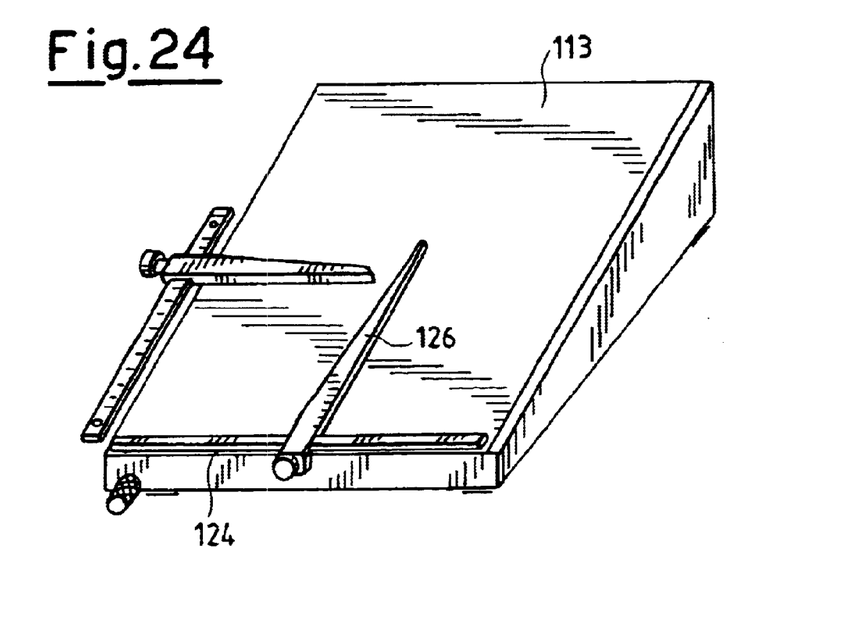
FIG. 24 illustrates a straight sliding edge related to the device of the finding.
Figure 25:
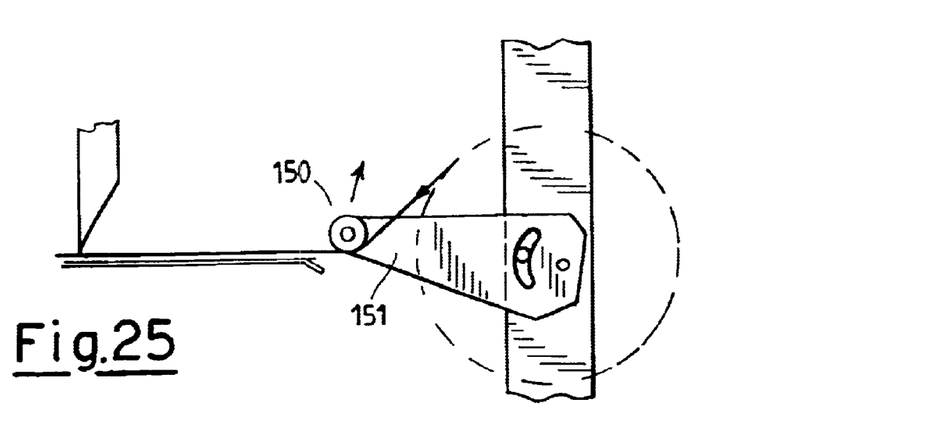
FIGS. 25 and 26 illustrate the presence of rebound rollers of dandy rolls on the reel holder.
Figure 26:
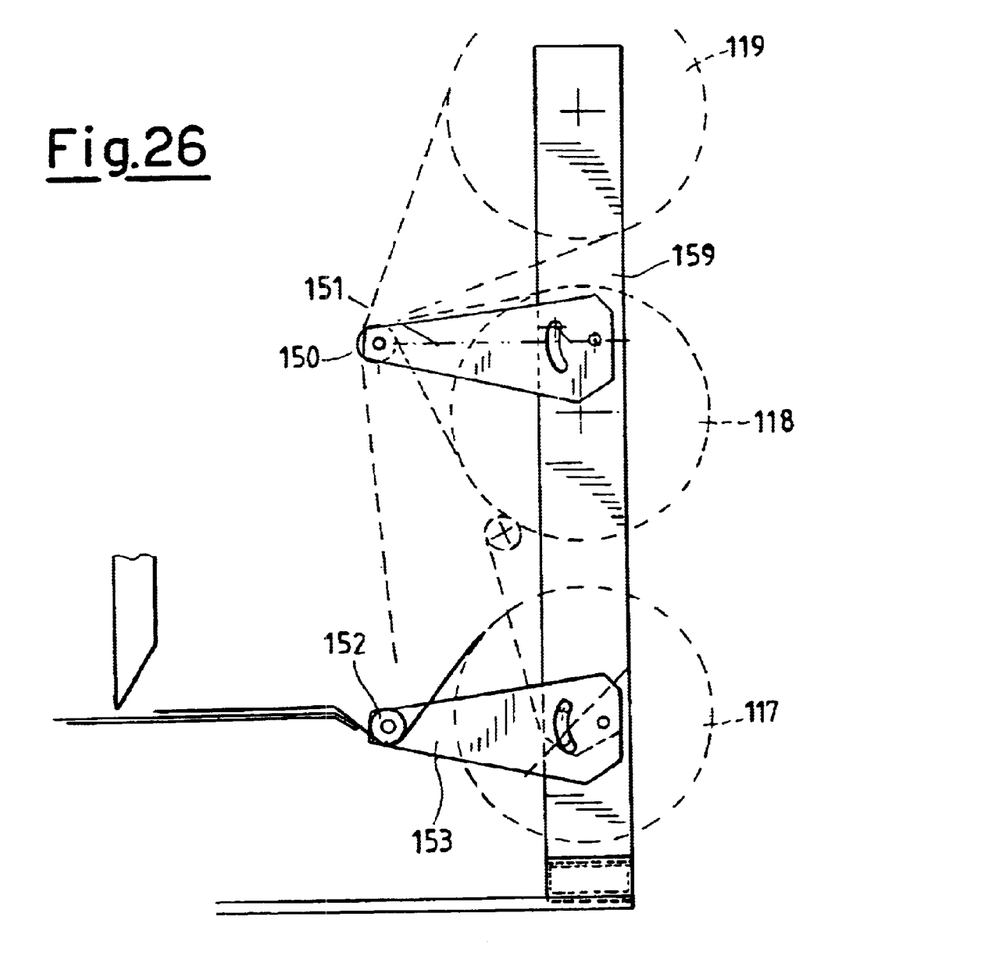

The straight sliding edge of element 126, related to the device of this finding, can also be mounted onto the profile of the extractable shelf in order to facilitate alignment during welding.

Figure 15:
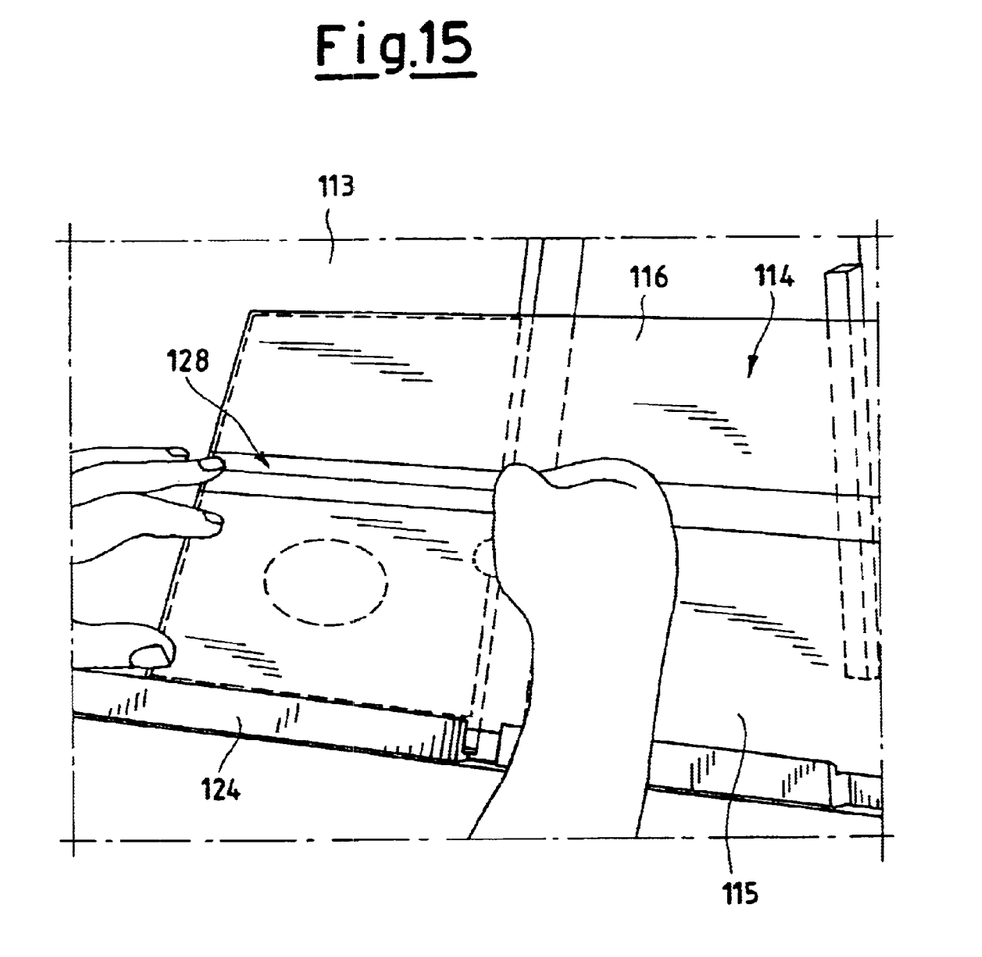

As can be seen from FIGS. 15 and 16, a rebound roller of dandy roll is mounted onto the reel holder, indicated respectively with 150 and 152, with the objective of removing the film for the welding area and therefore facilitating subsequent operations and helping the detachment of the welding.

The supports 151 and 153 of the rebound rollers 150 and 152 must be folded towards the support 159 of the reel holder, reducing encumbrance when the machine is not in use.

Figure 27:
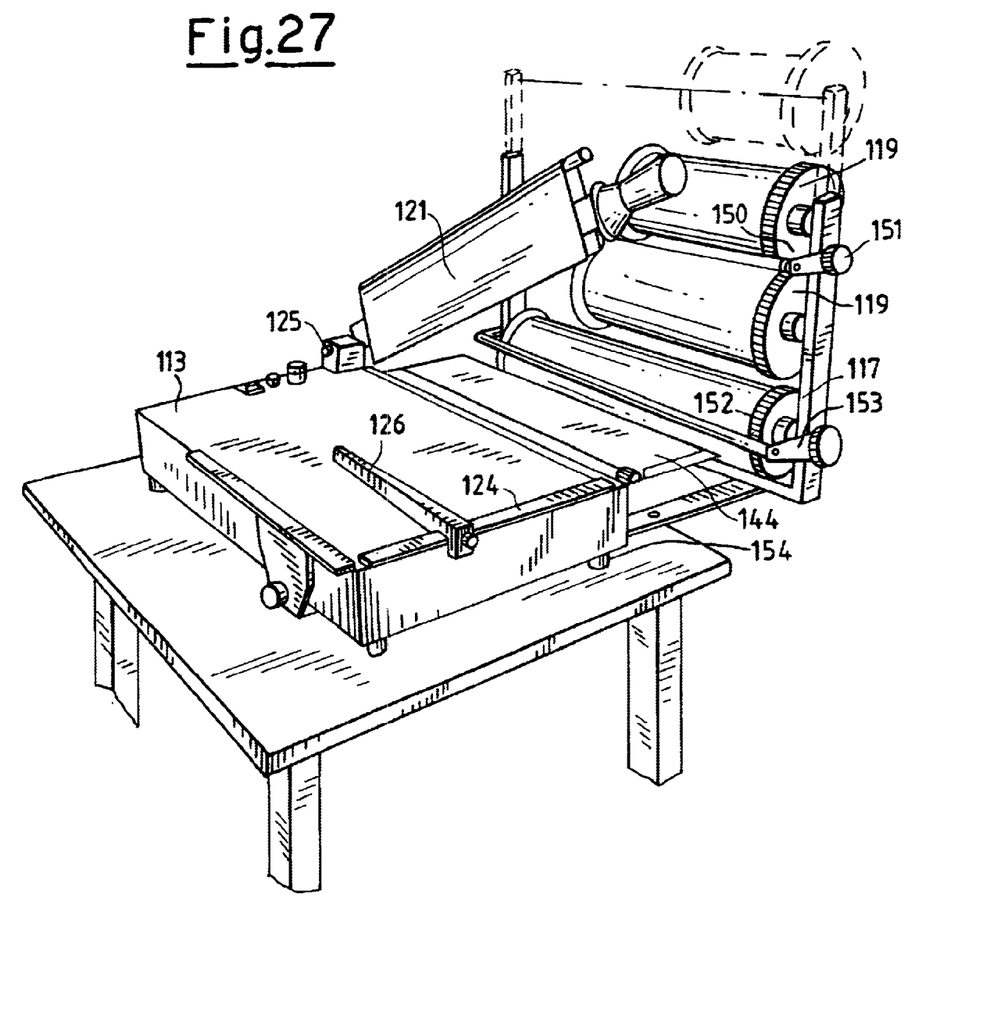
FIG. 27 illustrates the presence of supplementary feet belonging to the device of the present invention.

Through the use of additional feet 154, the reel holder can also work in a jolting manner, allowing for the machine to be used even on relatively small surfaces.

From the description provided above the features are clear of the procedure and device for the covering of editorial items, which are the subject of the present invention, just as the advantages are.

In particular, they are represented by:

reduced material waste a remarkable accuracy in work and consequent high quality of the article covered;

the possibility of obtaining a cover which is permanent and not easily removable for greater protection of the book a rapid and easy covering procedure, at extremely contained prices;

the possibility of covering books of various dimensions using the same reel the possibility of using machines that are already available on the market and to automate the procedure itself.

Finally, it is clear that numerous variants can be made to the procedure and device for the covering of editorial items, which are the subject of the present invention, without leaving behind the principles of novelty based within this inventive idea.

In the practical implementation of the invention, the materials, the forms and the dimensions of the details illustrated may be any at all according to the requirements and they may be replaced with others that are technically equivalent.

What is claimed is:

1. A procedure for the covering of editorial items, comprising positioning an opened editorial object (10) to be covered on a thermoplastic film (11) fitted with folds (12, 13, 31, 32) on its sides, so that said opened editorial object (10), on the film fitted with folds (12, 13, 31, 32), has sides (14, 15) of its cover tucked within said folds (12, 13, 31, 32); contacting said editorial object (10) with a head weld (30) of said thermoplastic film so that it is in a suitable position for a cutting and trimming step wherein excess thermoplastic film and welds of said sides of said editorial object (10), are subjected to cutting and trimming operations which are carried out by the use of a lever (17, 22, 24) fitted with hot resistances (18, 23, 25), wherein said folded thermoplastic film (11) is fed by a reel (21) and said thermoplastic film (11) located on said reel (21) has a fixed fold (12), and where said open editorial object (10) is placed on the folded thermoplastic film (11) with a side of its cover (14) being tucked into the fold (12), and an opposite side of the cover (15) being tucked into the opposite fold (13).

2. Procedure according to claim 1, wherein said fixed fold (12) is narrower than the opposite fold (13).

3. Procedure according to claim 1, wherein said cutting and trimming operations are carried out using levers (22, 24) fitted with hot resistances (23, 25) positioned at corners in such a way as to carry out two welds and trims in one operation.

4. Procedure according to claim 1, wherein said film (11) is a heat-shrinking film used on welding machines in order to make the cover adhere perfectly to said editorial object (10).

5. A procedure as defined in claim 1 wherein the editorial object is a book.

6. Procedure according to claim 1, after the editorial object (10) has been placed on the head weld (30) of the thermoplastic film (11), said thermoplastic film is cut and at the same time welded longitudinally using said lever (17) fitted with a hot resistance (18).

7. Procedure according to claim 6, comprising a step within which flaps (19, 20) of said thermoplastic film (11) on both sides of internal sides of the cover (14, 15) are added to the editorial object (10) through an additional weld.

* * * * *